United States Patent
Choi et al.

(10) Patent No.: US 8,355,697 B2
(45) Date of Patent: Jan. 15, 2013

(54) APPARATUS AND METHOD FOR PROVIDING BROADCAST SERVICE IN MOBILE COMMUNICATION SYSTEM

(75) Inventors: Yong-Seock Choi, Seoul (KR); Nam-Kyu Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1148 days.

(21) Appl. No.: 12/018,633

(22) Filed: Jan. 23, 2008

(65) Prior Publication Data
US 2008/0178209 A1 Jul. 24, 2008

(30) Foreign Application Priority Data
Jan. 23, 2007 (KR) .................. 10-2007-0006911

(51) Int. Cl.
*H04M 1/66* (2006.01)

(52) U.S. Cl. ............ 455/411; 455/410; 455/426.1; 455/414.1; 455/414.3

(58) Field of Classification Search ........... 348/734, 348/E7.061, E7.071; 455/410, 411, 414.1, 455/414.3, 426.1, 432.1, 466, 556.1; 725/25, 725/28, 62, 118
See application file for complete search history.

(56) References Cited

U.S. PATENT DOCUMENTS 6,785,901 B1 * 8/2004 Horiwitz et al. ............ 725/25
2003/0061606 A1 * 3/2003 Hartwig et al. ............. 725/25
2007/0021058 A1 * 1/2007 Arseneau et al. .......... 455/3.06
2007/0067807 A1 * 3/2007 O'Neil ........................ 725/62
2007/0260603 A1 * 11/2007 Tuscano et al. ............ 707/9

FOREIGN PATENT DOCUMENTS

| EP | 1 478 138 | 11/2004 |
| GB | 2 407 947 | 5/2005 |
| KR | 1020060006381 | 1/2006 |

* cited by examiner

*Primary Examiner* — Kamran Afshar
*Assistant Examiner* — Yousef Rod
(74) *Attorney, Agent, or Firm* — The Farrell Law Firm, P.C.

(57) ABSTRACT

A user authentication process when a portable terminal receives multimedia broadcasting requiring authentication is provided. The broadcasting is provided by a mobile communication system including a portable terminal capable of a user authentication process if a message indicating that broadcasting requires the authentication process is received while using the broadcast service, the portable terminal provides the broadcast service if the authentication process is successful, and stops the broadcast service if the authentication process fails; and a multimedia broadcast server for transmitting to the portable terminal the message, which indicates that the broadcasting requires the authentication process, when the broadcasting requires the authentication process while the broadcast service is being provided to the portable terminal.

12 Claims, 4 Drawing Sheets

APPARATUS AND METHOD FOR PROVIDING BROADCAST SERVICE IN MOBILE COMMUNICATION SYSTEM

PRIORITY

This application claims priority under 35 U.S.C. §119 to an application filed in the Korean Intellectual Property Office on Jan. 23, 2007 and assigned Serial No. 2007-6911, the contents of which are herein incorporated by reference.

BACKGROUND OF THE INVENTION

1. Field of the Invention

The present invention relates to a portable terminal capable of receiving multimedia broadcasting, and in particular, to an apparatus and method for performing a user authentication process when a portable terminal receives multimedia broadcasting.

2. Description of the Related Art

Mobile terminals are universally regarded as personal necessities of modern life for people of all ages and both sexes. Thus, service providers and terminal manufacturers are competitively developing differentiated products (or services).

For example, the mobile terminal has been developed into a multimedia device capable of providing various services such as phonebooks, games, short messages, e-mails, wake-up calls, MPEG Layer 3 (MP3) players, digital cameras, and wireless Internet services.

Furthermore, with the recent development of digital multimedia techniques, digital multimedia information is more frequently used, which leads to the development of a portable terminal capable of receiving a video service (e.g., digital broadcasting (terrestrial DMB, satellite DMB, etc.) and Video On Demand (VOD)). In particular, since the video service can be used while moving, such portable terminal has drawn interest from many users.

Such a video service may be provided with restriction. For example, a certain age group may be prevented from using the video service, or a pay video service may be provided only to a subscriber.

Specifically, in order to prevent adolescents from watching adult broadcasting, an authentication process is carried out in such a manner that a user who wants to use the video service using the portable terminal directly inputs personal authentication information, and only when the authentication process is successful, the user can watch the adult broadcasting.

However, since the authentication process is initially executed when using the video service, adolescents can easily access the adult broadcasting if it is broadcasted right after a broadcast, which does not require such authentication process.

Accordingly, there is a need for an apparatus and method in which broadcasting requiring authentication can be watched by only an authorized user using a portable terminal.

SUMMARY OF THE INVENTION

The present invention has been made to solve the aforementioned problems occurring in the prior art, and provides an apparatus and method for checking whether a user of a portable terminal is authorized to watch multimedia broadcasting in a mobile communication system.

The present invention also provides an apparatus and method for checking personal authentication information when a user watches multimedia broadcasting using a portable terminal.

The present invention also provides an apparatus and method in which an authentication request message is transmitted to a portable terminal when multimedia broadcasting is transmitted from a multimedia broadcast server.

According to a first aspect of the present invention, there is provided a mobile communication system providing a broadcast service, including a portable terminal for performing an authentication process if a message is received, which indicates that broadcasting requires the authentication process; for providing the broadcast service if the authentication process is successful, and for stopping the broadcast service if the authentication process fails; and a multimedia broadcast server for transmitting the message, which indicates to the portable terminal that the broadcast requires authentication, if it is thus required.

According to a second aspect of the present invention, there is provided a method of providing a broadcast service in a portable terminal, including receiving personal authentication information from a user by displaying an authentication screen if a message is received from a multimedia broadcast service, which indicates that the broadcasting requires authentication; performing the authentication process by comparing the personal authentication information received with authentication information pre-stored; if the authentication process is successful, receiving the broadcast service requiring the authentication process; and if the authentication process fails, ending the reception of the broadcast service requiring authentication.

According to a third aspect of the present invention, there is provided a method of providing a broadcast service in a multimedia broadcast server, including providing a message to a portable terminal requesting a broadcast service, indicating that the broadcast requires authentication, if the broadcast so requires, and providing the broadcast service; and repeating the step above until a broadcast service ending request is received from the portable terminal.

According to a fourth aspect of the present invention, there is provided a method of providing a broadcast service in a mobile communication system, including performing an authentication process if a message, which indicates that broadcasting requires the authentication process is received while using the broadcast service; providing the broadcast service if the authentication process is successful, and stopping the broadcast service if the authentication process fails; and providing the broadcast service by a multimedia broadcast server; transmitting the message to the portable terminal, which indicates that the broadcasting requires the authentication process, if it is checked that the broadcasting requires the authentication process while the broadcast service is being provided to the portable terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

The preferred embodiments of the present invention will now be explained with reference to the accompanying drawings. However, it should be understood that the disclosed embodiments are merely preferred, and may be embodied in various forms. Therefore, the details disclosed herein are not to be interpreted as limiting but merely as the basis for the claims and as a basis for teaching one skilled in the art how to make or use the invention. A detailed description of known functions and configurations incorporated herein has been omitted for the sake of clarity and conciseness.

An apparatus and method of the present invention will be described hereinafter, in which broadcasting requiring authentication is provided only to an authorized user using a portable terminal capable of receiving multimedia broadcasting.

Examples of the multimedia broadcasting include Digital Multimedia Broadcasting (DMB), Digital Video Broadcasting (DVB), Digital Audio Broadcasting (DAB), Media Forward Link Only (MediaFLO), and Video On Demand (VOD).

Further, examples of the portable terminal include all portable terminals supporting the reception of multimedia broadcasting, such as Personal Communication System (PCS), Personal Data Assistant (PDA), International Mobile Telecommunication-2000 (IMT-2000), and $4^{th}$ Generation (4G) broadband system. General structures of such portable terminals will be described in the following description.

Messages may be transmitted between a multimedia broadcast server and a portable terminal by the use of a Short Message Service (SMS)/Cell Broadcast service (CBS) message using a mobile communication network, Unstructured Supplementary Service Data (USSD), and Wireless Application Protocol (WAP) Push message. In addition, Entitlement Management Message (EMM) may be used, which is transmitted to the portable terminal when contents are purchased.

Figure 1:
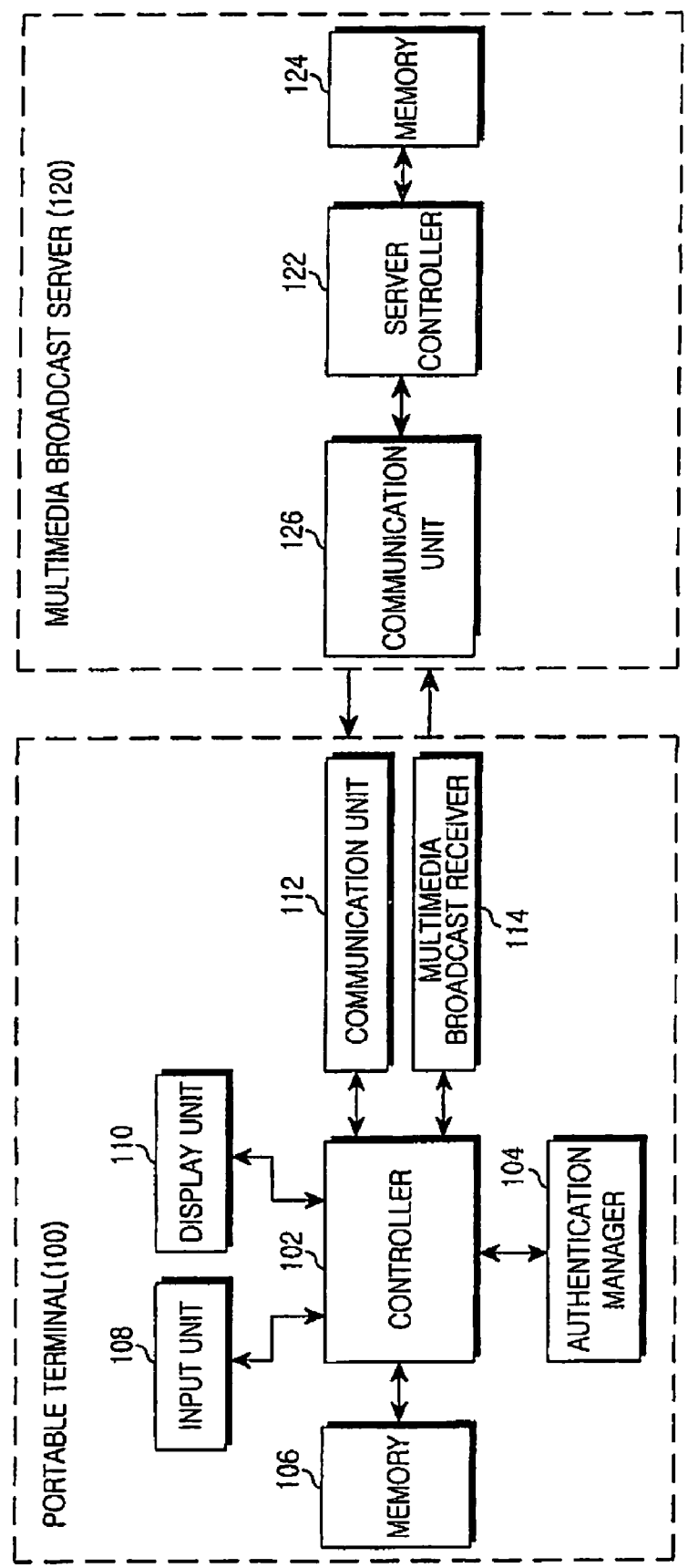
FIG. 1 is a block diagram of a mobile communication system in which broadcasting requiring authentication is provided only to an authorized user, according to the present invention.

Referring to FIG. 1, the mobile communication system includes a portable terminal 100, which requests multimedia broadcasting and receives the requested multimedia broadcasting, and a multimedia broadcast server 120 which provides the requested multimedia broadcasting to portable terminal 100.

Portable terminal 100 includes a controller 102, an authentication manager 104, a memory 106, an input unit 108, a display unit 110, a communication unit 112, and a multimedia broadcast receiver 114.

Controller 102 provides overall control to portable terminal 100. Specifically, controller 102 controls voice calls and data communications. According to the present invention, in addition to its typical functions, when an authentication request message is received from multimedia broadcast server 120, controller 102 allows display unit 110 to display an authentication screen containing items through which personal authentication information is input.

Thereafter, controller 102 allows authentication manager 104 to perform an authentication process for checking whether a user of portable terminal 100 is authorized to watch the multimedia broadcasting.

Details of the typical control functions of controller 102 will be omitted in the following description.

Under the control of controller 102, authentication manager 104 determines whether the user of portable terminal 110 is authorized to watch the multimedia broadcasting.

Specifically, authentication manager 104 compares authentication information received from controller 102 with authentication information pre-stored in memory 106 of portable terminal 100, and thus determines whether the user of portable terminal 100 is authorized to watch the multimedia broadcasting.

Memory 106 includes but is not limited to Read Only Memory (ROM), Random Access Memory (RAM), and Flash Memory. The ROM stores the microcode for the program that controls authentication manager 104 as well as various reference data. According to the present invention, personal authentication information for determining a user who is authorized to watch multimedia broadcasting can be pre-stored in the ROM.

The RAM is a working memory of controller 102, and stores data temporarily generated when programs are running. The Flash ROM stores various data, which needs to be preserved, and can be updated, such as a phone book, an outgoing message, and an incoming message. Memory 106 may include a Subscriber Identity Module (SIM).

Input unit 108 includes numeric key buttons (0 to 9), a menu button, an erase button, a confirm button, a talk button, an end button, an Internet access button, a navigation key (or direction key) button, and so on. Input unit 108 provides to controller 102 key input data (e.g., request to watch multimedia broadcasting) corresponding to a key pressed by a user.

Under the control of controller 102, display unit 110 displays state information generated while portable terminal 100 is operating, numeric characters, moving pictures, still pictures, and so on. Display unit 110 may be a color Liquid Crystal Display (LCD).

Communication unit 112 transmits and receives a Radio Frequency (RF) signal of data, through an antenna. For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

Multimedia broadcast receiver 114 is connected to multimedia broadcast server 120 and thus receives multimedia broadcasting at the request of the user. In addition, multimedia broadcast receiver 114 may transmit or receive a message which is required to request multimedia broadcasting.

Multimedia broadcast server 120 includes a communication unit 126, a server controller 122, and a memory 124.

Server controller 122 provides overall control to multimedia broadcast server 120. Upon receiving a multimedia broadcasting request from portable terminal 100, server controller 122 determines whether the requested multimedia broadcasting requires authentication. If the determination result shows that the multimedia broadcasting requires authentication, an authentication information request message is transmitted to portable terminal 100 under the control of multimedia broadcast server 120.

Furthermore, in order to determine whether broadcasting has been modified, server controller 122 checks the multimedia broadcasting transmitted to portable terminal 100. If it is determined that the multimedia broadcasting has been modified, the authentication information request message is transmitted to portable terminal 100.

Communication unit 126 communicates with portable terminal 100 and thus transmits the multimedia broadcasting. Under the control of server controller 122, communication unit 126 transmits the authentication information request message to portable terminal 100.

Memory 124 stores a program required to operate multimedia broadcast server 120.

Controller 102 may perform the function of authentication manager 104 of portable terminal 100. Although authentication manager 104 and controller 102 are separately constructed in the present invention, this is for explanation purpose only. Thus, in practice, controller 102 may perform the function of authentication manager 104.

Now, a method of the present invention will be described in which broadcasting requiring authentication is provided only to an authorized user by using the aforementioned apparatus.

Figure 2:
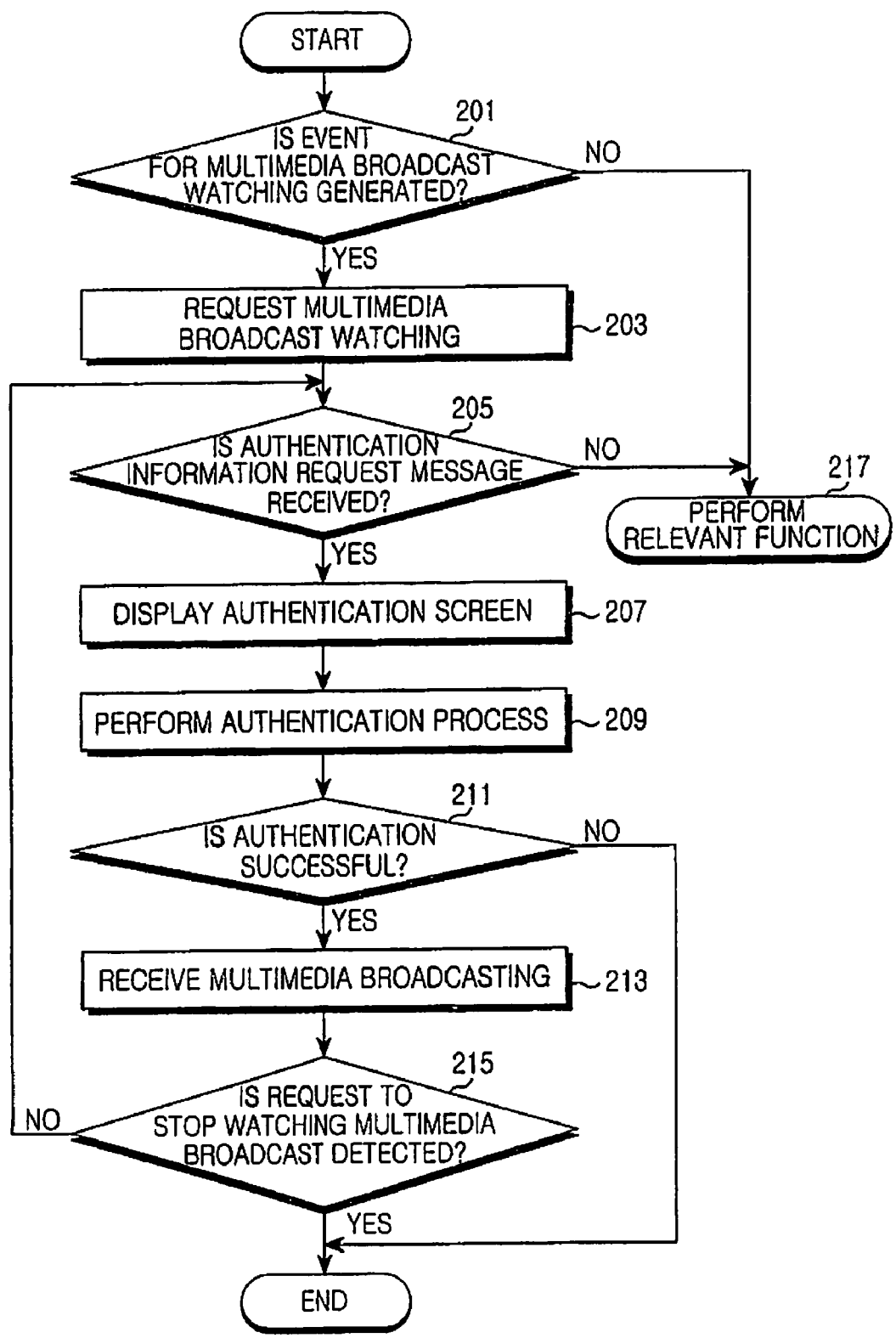
FIG. 2 is a flowchart of a method in which broadcasting requiring authentication is provided only to an authorized user in a portable terminal, according to the present invention.

Referring to FIG. 2, in step 201, controller 102 of portable terminal 100 checks whether a user generates an event for multimedia broadcast watching. If no event occurs, in step 217, controller 102 performs a relevant function (e.g., standby mode).

Upon detecting the occurrence of event, in step 203, controller 102 requests multimedia broadcast server 120 to send multimedia broadcasting at the request of the user.

In step 205, controller 102 checks whether an authentication information request message is received from multimedia broadcast server 120. The authentication information request message is used to check whether the user of portable terminal 100 is authorized to watch the multimedia broadcasting requiring the user authentication process.

For example, when portable terminal 100 requests multimedia broadcast server 120 to provide adult multimedia broadcasting which is not allowed to users under 19, multimedia broadcast server 120 sends to portable terminal 100 a message to check whether the user is an authorized user. The message is used to report the fact that authentication is required in the currently provided multimedia broadcasting.

If no message is received from multimedia broadcast server 120, in step 217, controller 102 performs a relevant function (e.g., reception of broadcasting which does not require rating restriction).

Upon receiving the authentication request message from multimedia broadcast server 120, in step 207, controller 102 allows display unit 110 to display an authentication screen. The authentication screen displayed on display unit 110 is used to input information which indicates whether the user of portable terminal 100 is authorized to watch the multimedia broadcasting. Examples of items displayed on the authentication screen include personal authentication information (e.g., social security number, Personal Identification Number (PIN), certificate, etc.).

In step 209, controller 102 checks the personal authentication information input by the user of portable terminal 100. While performing the authentication process, the personal authentication information input by the user may be compared with the personal authentication information pre-stored in memory 106 of portable terminal 100. The personal authentication information may contain, but is not limited to, the user's social security number, a Personal Identification Number (PIN), and a certificate.

In step 211, controller 102 determines whether the authentication process is successful. In this step, it is determined whether the user of portable terminal 100 is authorized to watch the multimedia broadcasting.

For example, if a PIN code input from the user matches with a PIN code pre-stored in memory 106 of portable terminal 100, controller 102 can determine that the authentication process is successful, and otherwise, controller 102 can determine that the authentication process fails.

If the determination result of step 211 shows that the authentication process performed in step 209 fails, controller 102 does not receive the multimedia broadcasting requested from the user of portable terminal 100, and the procedure is ended.

If it is determined that the authentication process fails while portable terminal 110 is receiving the multimedia broadcasting, it is possible to stop the reception of the multimedia broadcasting being received.

On the other hand, if the determination result of step 211 shows that the authentication process performed in step 209 is successful, in step 213, controller 102 receives multimedia broadcasting from multimedia broadcast server 120. Then, in step 215, it is checked whether there is a request to stop watching the multimedia broadcasting.

If there is no such request, step 205 is repeated. Otherwise, the procedure is ended.

Figure 3:
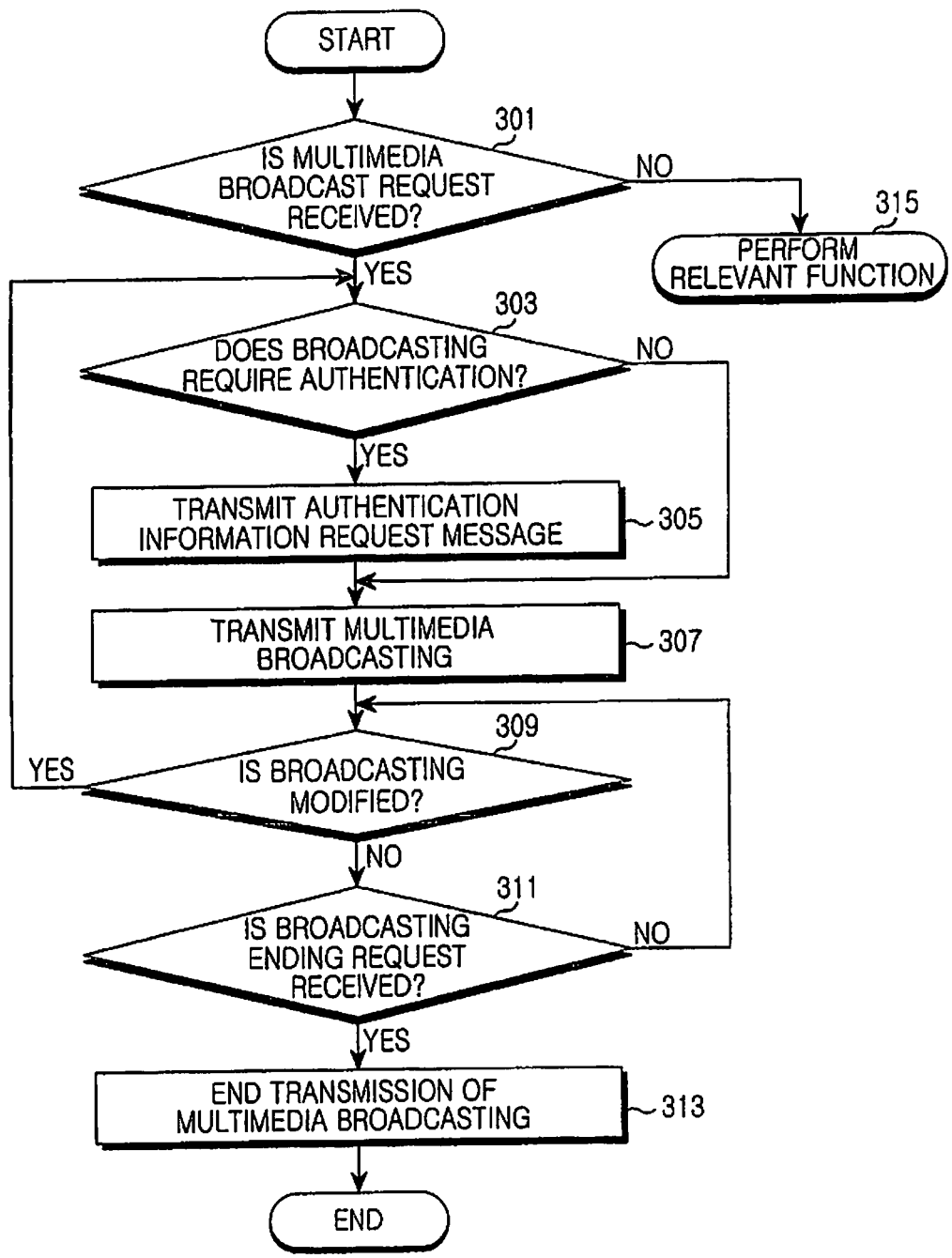
FIG. 3 is a flowchart of a method in which a multimedia broadcasting server requests a portable terminal requesting multimedia broadcasting to perform an authentication process, according to the present invention.

Referring to FIG. 3, in step 301, controller 122 of multimedia broadcast server 120 checks whether a multimedia broadcasting request is received from portable terminal 100. If no request is received, in step 315, controller 102 performs a relevant function (e.g., standby mode).

Upon receiving the request, in step 303, controller 122 checks whether broadcasting required by portable terminal 100 requires an authentication process. The authentication process is performed when the broadcasting (e.g., adult broadcasting, pay broadcasting, etc.) is provided only to an authorized user.

If the determination result of step 303 shows that the requested broadcasting requires the authentication process, in step 305, controller 122 transmits an authentication request message to portable terminal 100. Then, in step 307, controller 122 transmits the multimedia broadcasting to portable terminal 100.

In step 309, controller 122 checks whether the multimedia broadcasting provided to portable terminal 100 has been modified. The modification of broadcasting is defined as a situation where multimedia broadcasting currently being provided to portable terminal 100 is ended, and new broadcasting is provided.

Upon detecting the modification of broadcasting, step 303 is repeated. By doing so, broadcasting having rating restriction can be prevented from being accessed after broadcasting currently being received is modified to new broadcasting.

If the modification of broadcasting is not detected, in step 311, controller 122 checks whether a broadcasting ending request is received from portable terminal 100. If the broadcasting ending request is not received, step 309 is repeated.

Upon receiving the broadcasting ending request, in step 313, controller 122 stops the transmission of multimedia broadcasting to the portable terminal 100. Then, the procedure is ended.

Figure 4:
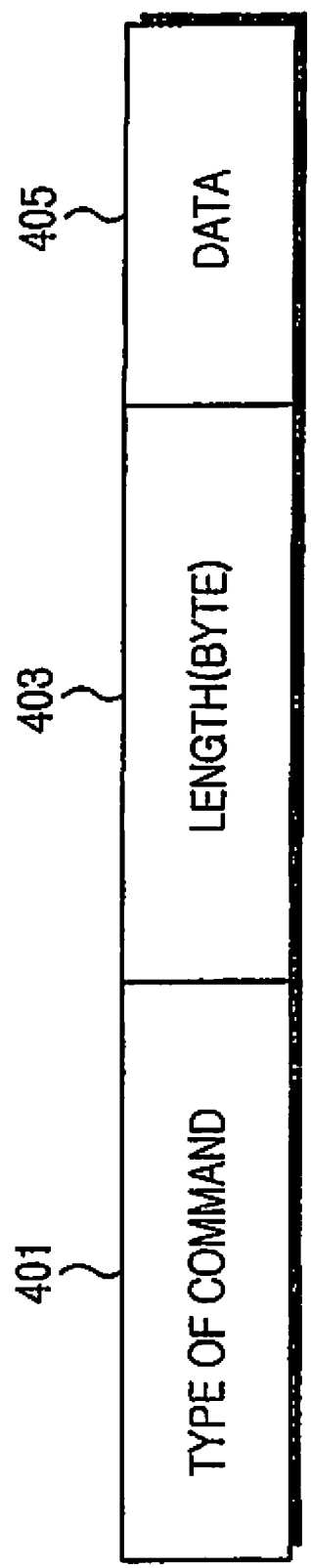
FIG. 4 illustrates a format of a message used to perform an authentication process whereby an authorized user can watch multimedia broadcasting in a mobile communication system, according to the present invention.

Referring to FIG. 4, the message format is composed of a type-of-command field 401 indicating a command type, a length field 403, and a data field 405.

Type-of-command field 401 contains commands, which are needed to perform an authentication process. Type-of-command field 401 may be defined as described in Table 1 below.

TABLE 1

| Type of Command | Value |
|---|---|
| 00 | Reserved |
| 01 | Request Authentication Process |
| 02 | Modify Personal Authentication Information |

For example, when portable terminal 100 receives a message having the type-of-command field 401 of '01', portable terminal 100 may perform the authentication process by displaying an authentication screen on the display unit 110. By using a message having type-of-command field 401 of '02', portable terminal 100 may modify pre-defined personal authentication information. The personal authentication information to be modified may be contained in data filed 405.

Length field 403 indicates the length of data in the unit of byte.

Data field 405 contains data (TLV), which needs to be transmitted from multimedia broadcast server 120 to portable terminal 100.

The personal authentication information may be modified in the following manners: the aforementioned message format is used, PIN code authentication and modification may be performed on the portable terminal by using an Over The Air (OTA) provisioning method which is used as an OMA standard as described below; and a phone number of a customer center is transmitted to connect a voice call, so as to receive a desired service. One example of an OTA provision's vendor configuration (tag for supporting user specific service) is described below.

```
<characteristic type="VENDORCONFIG">
<parm name="Parental-PIN mode" value="00"/>
<parm name="Parental-PIN code" value="12345678"/>
<parm name="ServiceCenterAddr" value="+82016114"/>
</characteristic>
```

"Parental-PIN mode" denotes a value for requesting modification of a personal authentication number, and "Parental-PIN code" denotes a personal authentication number to be modified and may be set to 8 bytes. In addition, "ServcieCenterAddr" denotes a customer center address.

According to the present invention, when a user watches multimedia broadcasting by using a portable terminal, a user authentication process is carried out if the multimedia broadcasting requires authentication. Therefore, it is possible to avoid the multimedia broadcasting from being watched by an unauthorized user.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A mobile communication system providing a broadcast service, comprising:
    a portable terminal capable of a user authentication process if a message indicating that a broadcast requires the authentication process is received while using the broadcast service, the portable terminal provides the broadcast service if the authentication process is successful, and stops the broadcast service if the authentication process fails; and
    a multimedia broadcast server for transmitting to the portable terminal the message, which indicates that the broadcasting requires the authentication process, when a modified broadcast requires the authentication process while the broadcast service is being provided to the portable terminal,
    wherein the modified broadcast occurs when multimedia broadcasting currently being provided to the portable terminal is ended, and new broadcasting is provided,
    wherein the portable terminal comprises:
        an authentication manager for authenticating the user of the portable terminal establishing authorized use of the broadcast service; and
        a controller for receiving a personal authentication information of the user and providing it to the authentication manager, and
    wherein the personal authentication information required for the authentication process is modified under the control of the controller, when the message indicates that the personal authentication information is to be modified.

2. The mobile communication system of claim 1, wherein the multimedia broadcast server determines that the authentication process is required in at least one case selected from the group consisting of:
    a request for starting the broadcast service is received;
    a new broadcast service is provided after ending the broadcast service being provided; and
    a broadcast service having rating restriction is provided.

3. The mobile communication system of claim 1, wherein a message transmission between the portable terminal and the multimedia broadcast server is achieved by using at least one message selected from a group consisting of:
    a Short Message Service (SMS)/Cell Broadcast Service (CBS) message using a mobile communication network;
    Unstructured Supplementary Service Data (USSD);
    a Wireless Application Protocol (WAP) Push message; and
    an Entitlement Management Message (EMM) transmitted to the portable terminal when contents are purchased.

4. The mobile communication system of claim 1, wherein the authentication manager compares the personal authentication information received from the controller with authentication information pre-stored in the portable terminal to determine whether the user is authorized to use the broadcast service, and provides the determination result to the controller.

5. The mobile communication system of claim 1, wherein the controller stops the provision of the broadcast service if information indicating that the user of the portable terminal is not authorized to use the broadcast service is received from the authentication manager.

6. A method of providing a broadcast service in a portable terminal, comprising the steps of:
   receiving a personal authentication information from a user by displaying an authentication screen when a message is received from a multimedia broadcast service indicating that a modified broadcasting requires authentication;
   performing the authentication process by comparing the personal authentication information received with authentication information pre-stored;
   receiving the broadcast service requiring the authentication process when the authentication process is successful;
   ending the reception of the broadcast service requiring the authentication process when the authentication process fails; and
   modifying, by the portable terminal, the personal authentication information, when the message indicates that the personal authentication information is to be modified,
   wherein the modified broadcasting occurs when multimedia broadcasting currently being provided to the portable terminal is ended, and new broadcasting is provided.

7. The method of claim 6, further comprising modifying the personal authentication information.

8. A method of providing a broadcast service in a multimedia broadcast server, comprising the steps of:
   providing, to a portable terminal requesting a broadcast service, a message, indicating that a modified broadcast requires an authentication process, if the modified broadcast requires the authentication process, and providing the modified broadcast service; and
   repeating the step above until a broadcast service ending request is received from the portable terminal,
   wherein the modified broadcast occurs when multimedia broadcasting currently being provided to the portable terminal is ended, and new broadcasting is provided, and
   wherein the message indicates that personal authentication information required for the authentication process must be modified, when the personal authentication information required for the authentication process must be modified.

9. The method of claim 8, wherein, to indicate whether the broadcasting requires the authentication process, the multimedia broadcast server uses at least one message selected from a group consisting of:
   a Short Message Service (SMS)/Cell Broadcast Service (CBS) message using a mobile communication network;
   Unstructured Supplementary Service Data (USSD);
   a Wireless Application Protocol (WAP) Push message; and
   an Entitlement Management Message (EMM) transmitted to the portable terminal when contents are purchased.

10. The method of claim 9, wherein the multimedia broadcast server determines that the authentication process is required in at least one case selected from a group consisting of:
   a request for starting the broadcast service is received from the portable terminal;
   a new broadcast service is provided after ending the broadcast service being provided; and
   a broadcast service with limited ratings is provided.

11. A non-transitory computer-readable recording medium having recorded thereon a program for performing a method of providing a broadcast service in a mobile communication system, the method comprising:
   receiving a personal authentication information from a user by displaying an authentication screen when a message is received from a multimedia broadcast service indicating the broadcasting requires authentication;
   performing the authentication process by comparing the personal authentication information received with pre-stored authentication information;
   receiving the broadcast service requiring the authentication process when the authentication process is successful;
   ending the reception of the broadcast service requiring the authentication process when the authentication process fails; and
   modifying, by the portable terminal, the personal authentication information, when the message indicates that the personal authentication information is to be modified,
   wherein the modified broadcasting occurs when multimedia broadcasting currently being provided to the portable terminal is ended, and new broadcasting is provided.

12. A non-transitory computer-readable recording medium having recorded thereon a program for performing a method of providing a broadcast service in a mobile communication system, the method comprising:
   providing, to a portable terminal requesting a broadcast service, a message, indicating that a modified broadcast requires an authentication process, if the modified broadcast requires the authentication process, and providing the modified broadcast service; and
   repeating the step above until a broadcast service ending request is received from the portable terminal,
   wherein the modified broadcast occurs when multimedia broadcasting currently being provided to the portable terminal is ended, and new broadcasting is provided, and
   wherein the message indicates that personal authentication information required for the authentication process must be modified, when the personal authentication information required for the authentication process must be modified.

* * * * *